US008049926B2

(12) United States Patent
Hayward et al.

(10) Patent No.: US 8,049,926 B2
(45) Date of Patent: Nov. 1, 2011

(54) METHODS AND SYSTEMS FOR SELECTING A COLOR

(75) Inventors: Ken Hayward, Brockport, NY (US); Robert I. Jacobs, Fairport, NY (US); Thomas J. Perry, Fairport, NY (US); Brandon S. McComber, Rochester, NY (US); Geoffrey J. Woolf, New South Wales (AU); Mary Ann Sprague, Macedon, NY (US); Jennifer Perotti, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 451 days.

(21) Appl. No.: 12/287,122

(22) Filed: Oct. 6, 2008

(65) Prior Publication Data

US 2010/0085587 A1 Apr. 8, 2010

(51) Int. Cl.
*H04N 1/60* (2006.01)
*H04N 1/46* (2006.01)
*G03F 3/08* (2006.01)
(52) U.S. Cl. .................. 358/1.9; 358/504; 358/518
(58) Field of Classification Search .................. None
See application file for complete search history.

(56) References Cited

U.S. PATENT DOCUMENTS

| 6,381,036 B1* | 4/2002 | Olson ........................... 358/1.9 |
| 2008/0127846 A1* | 6/2008 | Nagai ........................... 101/365 |
| 2008/0130022 A1* | 6/2008 | Dalal et al. ..................... 358/1.9 |

* cited by examiner

*Primary Examiner* — Twyler Haskins
*Assistant Examiner* — Christopher D Wait
(74) *Attorney, Agent, or Firm* — Pepper Hamilton LLP (57) ABSTRACT

Methods and systems of selecting a color for a print operation are disclosed. A color including a color formula with multiple color components may be selected based on a reference color. A print sample may be printed on a printing device based on the selected color. The print sample may include the selected color and one or more rings of color variants. Each ring may include a plurality of color variants differing from a color component of the selected color by a corresponding amount. Each color variant may be aligned axially based on the color component that differs from the selected color and a magnitude of a difference between the color component of the color variant and the selected color. The print sample may be compared to the reference color. A document may be printed on the printing device using at least the color formula for the selected color.

17 Claims, 12 Drawing Sheets
(7 of 12 Drawing Sheet(s) Filed in Color)

METHODS AND SYSTEMS FOR SELECTING A COLOR

BACKGROUND

The present disclosure generally relates to the operation of a document production environment. More specifically, the present disclosure relates to methods and systems for enabling accurate reproduction of spot colors in a print job.

Document production environments, such as print shops, convert printing orders, such as print jobs, into finished printed material. A print shop may process print jobs using resources such as printers, cutters, collators and other similar equipment. Typically, resources in print shops are organized such that when a print job arrives from a customer at a particular print shop, the print job can be processed by performing one or more production functions.

Customers increasingly request print jobs requiring the production of materials printed in color. In some cases, customers require one or more images in the print job to be produced using precise colors (referred to as "spot colors"). For example, a company logo or other trademark might utilize a specific known color that is representative of the company's brand. If a print shop operator is unable to accurately produce a spot color, the printed materials would likely have to be discarded for some or all of the print job. As a result, print jobs having inaccurately produced spot colors or that otherwise have poor image quality can result in increased cost to the print shop operator due to the utilization of extra paper, ink and the like to reproduce the print job. Moreover, the customer might not receive printed materials for the particular print job that have an acceptable image quality within a required time frame.

Digital printing systems typically do not directly print spot colors, but instead utilize a plurality of colors mixed in different proportions to produce the colors. Conventionally, print operations printing a full range of colors have been performed using printing materials having four colors that use three primary ink colors—cyan, magenta, and yellow—plus black (abbreviated as CMYK). More recently, printing materials having five or more colors ("high fidelity") have been introduced to provide a larger and more vibrant color gamut. An exemplary set of high fidelity printing materials is Pantone's Hexachrome system, which adds orange and green to the traditional CMYK. Unlike 4 color printing, high fidelity printing does not have a set of colors that dominates the printing industry. High fidelity color printing is most commonly achieved via the use of a "CMYK+2" set of printing materials, such as one of the following: Cyan-Magenta-Yellow-Black-Orange-Green (CMYKOG), Cyan-Light Cyan-Magenta-Light Magenta-Yellow-Black (CcMmYK), Cyan-Light Cyan-Magenta-Pink-Yellow-Black (CcMPYK), Cyan-Magenta-Yellow-Black-Orange-Violet (CMYKOV), or Cyan-Magenta-Yellow-Black-Orange-Blue (CMYKOB) printing materials. The two colors are typically chosen based on the part of the color gamut that is important for a particular output. For example, if an output includes skin tones, CMYKOV is often selected. Similarly, if the output includes a nature scene with grass and trees, CMYKOG is typically selected.

Digital font ends for digital printers typically provide a spot color library, such as a Pantone® color library, that includes specifications for a particular set of printing materials. As such, designated spot colors should be approximately matched using the library. However, many print shop operators and/or customers are not satisfied with the colors created by the default library values. This may result, at least in part, from a known condition affecting digital printers in which the image quality of printed materials drifts over time. In other words, the printers utilized by a print shop operator might not produce the same output color for a specified color mix. Other variables that can cause the need to edit spot colors include the white point or color of a print medium, a coating on the print medium, and/or the like. As such, spot color editing may be required for many, if not all, print jobs that utilize color reproduction.

Printer calibration is an iterative process that requires the print shop operator to compare a test print with a spot color provided by the customer. The editing process can consume considerable time because of the need to make a test print after every edit. As such, print jobs that are highly color critical can require many edit and test cycles to obtain an acceptable match for a spot color or Pantone® color.

SUMMARY

Before the present systems, devices and methods are described, it is to be understood that this disclosure is not limited to the particular systems, devices and methods described, as these may vary. It is also to be understood that the terminology used in the description is for the purpose of describing the particular versions or embodiments only, and is not intended to limit the scope.

It must also be noted that as used herein and in the appended claims, the singular forms "a," "an," and "the" include plural references unless the context clearly dictates otherwise. Thus, for example, reference to a "color swatch" is a reference to one or more color swatches and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments, the preferred methods, materials, and devices are now described. All publications mentioned herein are incorporated by reference. Nothing herein is to be construed as an admission that the embodiments described herein are not entitled to antedate such disclosure by virtue of prior invention. As used herein, the term "comprising" means "including, but not limited to."

In an embodiment, a method of selecting a color for a print operation may include selecting a color, including a color formula having a plurality of color components, based on a reference color, printing, on a printing device, a print sample based on the selected color, comparing the print sample to the reference color, and printing, on the printing device, a document using at least the color formula for the selected color. The print sample may include the selected color and one or more rings of color variants in which each ring includes a plurality of color variants differing from a color component of the selected color by a corresponding amount. Each color variant may be aligned axially based on the color component that differs from the selected color and a magnitude of a difference between the color component of the color variant and the color component of the selected color.

In an embodiment, a system for selecting a color for a print operation may include a processor, a processor-readable storage medium in communication with the processor, a display device in communication with the processor, and a printing device in communication with the processor. The processor-readable storage medium may contain one or more programming instructions for receiving a selection of a color that includes a color formula having a plurality of color components, printing, via the printing device, a print sample based on the selected color, displaying a representation of the print sample on the display device, and printing, via the printing device, a document using at least the color formula for the selected color. The print sample may include the selected color and one or more rings of color variants in which each ring comprises color variants differing from a color component of the selected color by a corresponding amount. Each color variant may be aligned axially based on the color component that differs from the selected color and a magnitude of a difference between the color component of the color variant and the color component of the selected color, In an embodiment, a method of producing a print sample may include producing a first color swatch, including a current color, at a center position of the print sample, for each of a plurality of axes (each axis corresponding to a color component), producing a plurality of second color swatches along the axis of the print sample, and displaying the print sample. Each second color swatch may be aligned based on a magnitude of a difference between the corresponding color component of the second color swatch and the corresponding color component of the current color.

In an embodiment, a method of producing a print sample may include producing a first color swatch, including a current color that has a value for each of a plurality of color components, at a center position of the print sample, producing a plurality of second color swatches, producing a plurality of third color swatches, and displaying the print sample. Each second color swatch may include a color that differs from the first color swatch with respect to only one color component. For each second color swatch, the color component that differs from the first color swatch may differ by a first magnitude. Each second color swatch may be arranged along an axis corresponding to the color component by which the second color swatch differs from the first color swatch and according to a polarity of the magnitude by which the second color swatch differs from the first color swatch. Each third color swatch may include a color that differs from the first color swatch with respect to only one color component. For each third color swatch, the color component that differs from the first color swatch may differ by a second magnitude. Each third color swatch may be arranged along the axis corresponding to the color component by which the third color swatch differs from the first color swatch and according to a polarity of the magnitude by which the third color swatch differs from the first color swatch.

BRIEF DESCRIPTION OF THE DRAWINGS

The file of this patent contains at least one photograph or drawing executed in color. Copies of this patent with color drawing(s) or photograph(s) will be provided by the Patent and Trademark Office entitled request and payment of the necessary fee.

Aspects, features, benefits and advantages of the present invention will be apparent with regard to the following description and accompanying drawings, of which.

DETAILED DESCRIPTION

The following terms shall have, for the purposes of this application, the respective meanings set forth below.

For purposes of the discussion below, a "print shop" refers to an entity that includes a plurality of document production resources, such as printers, cutters, collators and the like. The print shop may be a freestanding entity, such as a commercial printer, or it may be part of a corporation or other entity.

A "job" refers to a logical unit of work that is to be completed for a customer. For example, a job may include one or more print jobs from one or more clients. Alternately, a job may include an electronic document file and a set of printing instructions.

A "print job" refers to a job processed in a document production system. For example, a print job may include producing credit card statements corresponding to a certain credit card company, producing bank statements corresponding to a certain bank, printing a document, or the like.

A "color component" refers to one of a plurality of printing materials used for a print operation. For example, CMYK printing materials include a cyan color component, a magenta color component, a yellow color component and a black color component.

A "ring" refers to a plurality of colors that each have a color formula that differs from the color formula of a base color with respect to one color component and by a common amount. For example, a ring may include colors for which a first color component differs by 5 units from a base color and all other color components are the same. As such, a ring may include up to a number of colors equal to two times the number of color components in printing materials used by a printer (i.e., for a CMYK printing device, up to 8 colors may be in a ring). A ring may have less than this maximum number if the base color is sufficiently close to a maximum or minimum value for at least one color component. Concentric rings may be organized such that colors differing in the same color component from the base color and with the same polarity are aligned on a common axis. Exemplary rings are depicted in FIGS. 2, 3, 5 and 6.

Color digital font ends (DFEs), such as the FreeFlow Print Server® from Xerox Corporation, typically contain spot color libraries. Such libraries include collections of named colors, each having a specific color formula based on the particular set of printing materials (e.g., CMYK) being used.

Figure 1:
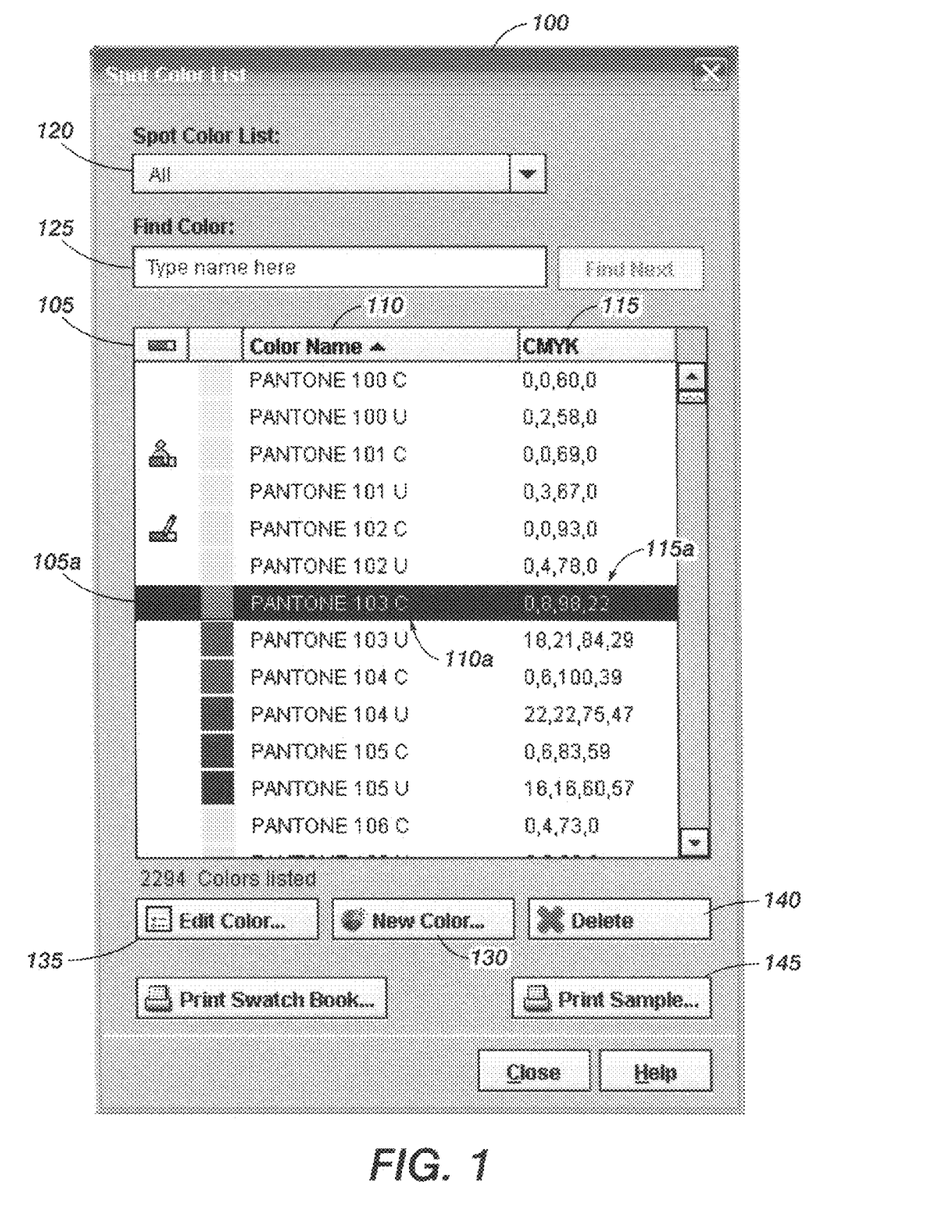
FIG. 1 depicts an exemplary graphical user interface screen displaying a list of spot colors according to an embodiment.

FIG. 1 depicts an exemplary graphical user interface screen displaying a list of spot colors according to an embodiment. As shown in FIG. 1, the spot color list graphical user interface screen 100 may include a color swatch column 105, a color name column 110, and one or more color formula columns 115. The color swatch column 105 may include a plurality of color swatches. Each color swatch, such as 105a, may graphically depict a particular spot color. The color name column 110 may include a plurality of color names. Each color name, such as 110a, may depict the name associated with a corresponding color swatch 105a. Each color formula column 115 may include a plurality of base color formulae based on the particular set of printing materials used by an associated printing device. If multiple sets of printing materials can be used by the associated printing device, a separate color formula column 115 may be used for each set of printing materials. Each color formula, such as 115a, may be associated with a corresponding color swatch 105a and/or color name 110a. In an embodiment, at least one of the color swatches 105a, color name 110a and color formula 115a may not be specified for a particular entry in the spot color list.

As shown in FIG. 1, additional features may be implemented by the spot color list graphical user interface screen 100. For example, tools may be provided to assist a user with locating and selecting a particular spot color. Exemplary tools may include a filter tool 120 and/or a search tool 125. The filter tool 120 may enable a user to select a particular set of spot colors for the list. For example, as shown in FIG. 1, the filter tool 120 may enable all spot colors to be listed. Alternately, the filter tool 120 may list a subset of all available spot colors, such as Pantone® colors, user-defined spot colors and/or the like. The search tool 125 may enable a user to search for a spot color based on at least a portion of a color name 110 associated with the spot color. In an alternate embodiment, the search tool 125 may enable a user to search for a spot color based on at least a portion of a color formula 115 associated with the spot color.

In an embodiment, the user may create a new color using a new color button 130 associated with the graphical user interface. For example, clicking the new color button 130 may enable a user to assign a color formula and a color name for a new spot color. In an embodiment, if the new color button 130 is selected when no color is selected in the list, a middle grey color (i.e., CMYK values of 50, 50, 50, 50) may be used as an original color. In contrast, if the new color button 130 is selected when a color is selected in the list, the values of the selected color may be used for the original color. This may enable a user to generate a new color based on a color that closely approximates the new color.

In an embodiment, a color swatch may be generated for the new color based on the color formula. In an alternate embodiment, one or more new spot colors may be uploaded by software associated with the spot color list graphical user interface screen 100, for example, upon direction from a user, at periodic intervals, and/or as new spot colors are made available.

A user may select a particular spot color, for example, by clicking on a color swatch, such as 105a, color name, such as 110a, and/or color formula, such as 115a, associated with the spot color. Once a user has selected a particular spot color, the graphical user interface screen 100 may enable additional functions to be performed by the user. For example, as shown in FIG. 1, the spot color list graphical user interface screen 100 may enable an edit color button 135, a delete color button 140 and/or a print sample button 145 for selection by a user.

Selecting the edit color button 135 may enable the user to access a graphical user interface screen for editing the selected spot color, such as the graphical user interface screen 200 described below in reference to FIG. 2A. Selecting the delete color button 140 may enable the user to delete a selected spot color from the spot color list. Selecting the print sample button 145 may cause a print sample of the selected spot color to be printed on an associated printing device.

Additional, fewer and/or alternate features may be implemented using the spot color list graphical user interface screen 100 within the scope of this disclosure.

Figure 2A:
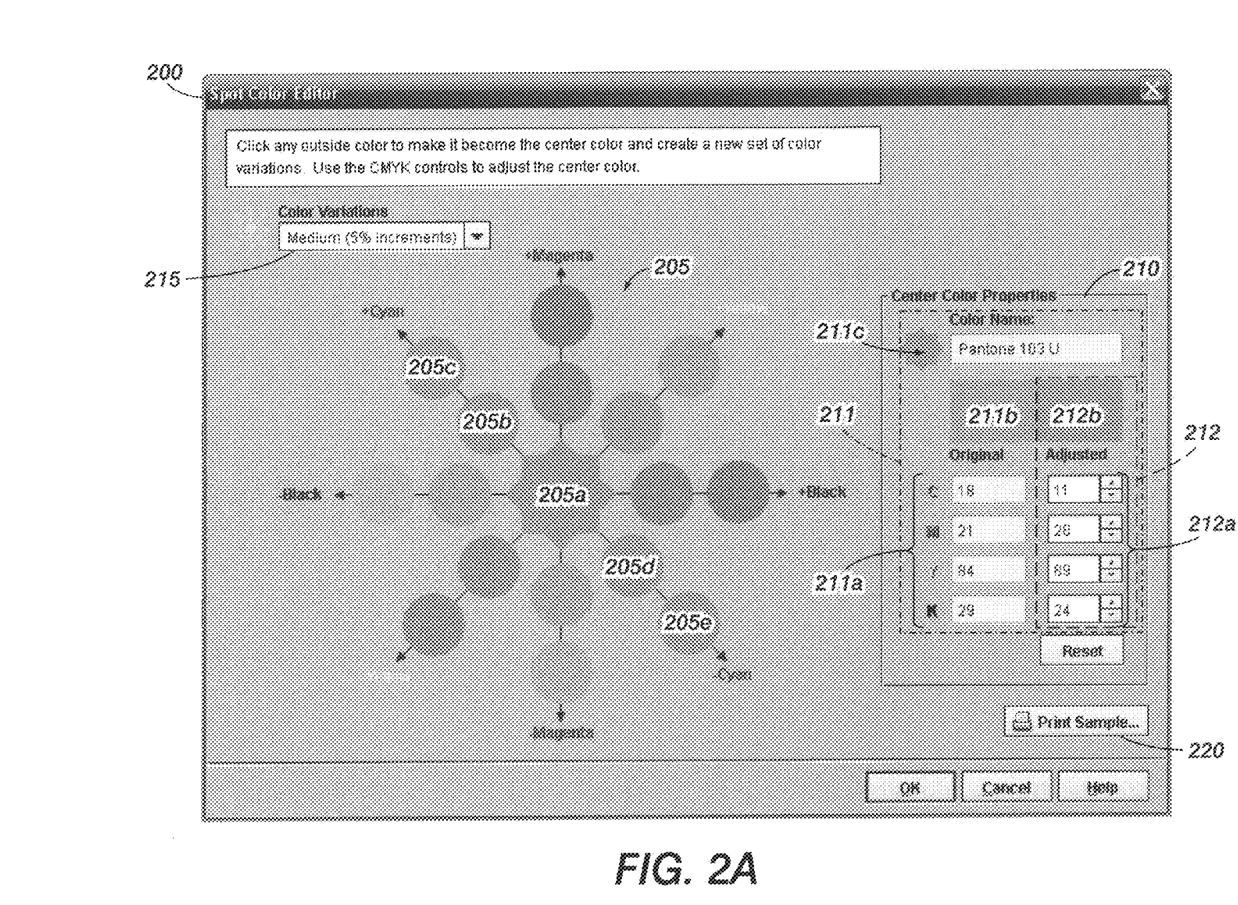
FIG. 2A depicts an exemplary graphical user interface screen displaying an editing tool for spot colors according to an embodiment.

FIG. 2A depicts an exemplary graphical user interface screen displaying an editing tool for spot colors according to an embodiment. The spot color editor graphical user interface screen 200 depicted in FIG. 2A may provide a visual tool for a user to edit a color. In addition, the spot color editor graphical user interface screen 200 may enable setup for a print sample containing spot color variants. As shown in FIG. 2A, the spot color editor graphical user interface screen 200 may include a ring-around color display 205, a center color properties display 210, a color variation selection tool 215 and/or a print sample button 220. In an embodiment, instructions may be displayed on the spot color editor graphical user interface screen 200 to assist the user in utilizing the screen. Additional, fewer and/or alternate features may be implemented using the spot color editor graphical user interface screen 200 within the scope of this disclosure.

When the spot color editor graphical user interface screen 200 is first displayed, such as after selection of a spot color from the spot color list graphical user interface screen 100, the spot color editor graphical user interface screen may be configured based on the selected spot color. For example, the center position 205a of the ring-around color display 205 may display the color swatch for the selected spot color; the center color properties display 210 may display the color name, the color swatch, and/or the color formula for the selected spot color; and/or the like.

Figure 3:
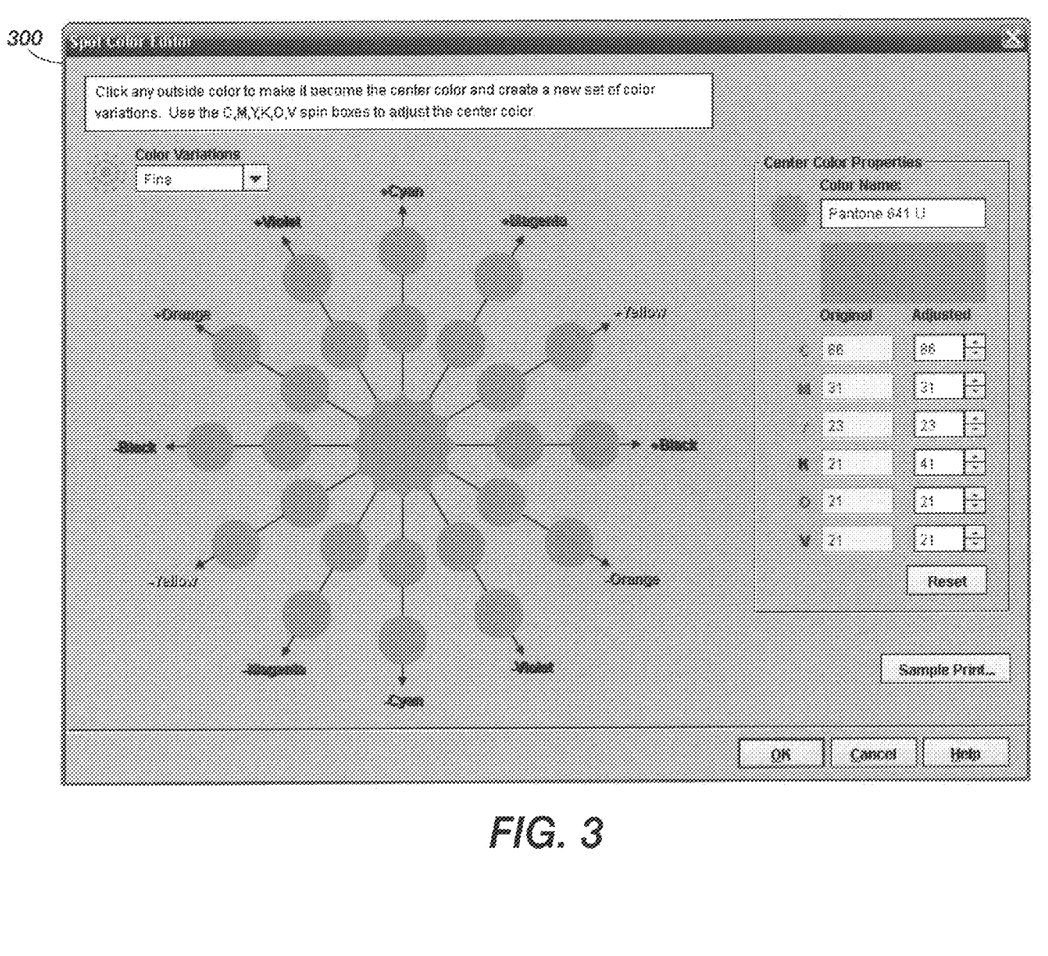
FIG. 3 depicts an alternate exemplary graphical user interface screen displaying an editing tool for spot colors according to an embodiment.

The ring-around color display 205 may display a current color at the center position 205a and a number of color variants surrounding the center position. Color variants may be organized along axes corresponding to each color component in the printing materials. For example, FIG. 2A depicts four axes corresponding to each color component in the CMYK printing materials (Cyan, Magenta, Yellow and Black). Although the present disclosure provides illustrations of the ring-around color display 205 based on the CMYK printing materials, it will be apparent to those of ordinary skill in the art that corresponding ring-around color displays may be generated for any printing materials, including high-fidelity printing materials. In a ring-around color display 205 for high-fidelity printing materials, additional axes would be required, such as is shown in FIG. 3.

No more than a specified number of color variants may be displayed along each axis of the ring-around color display 205. For example, as shown in FIG. 2A, no more than two color variants may be displayed in the positive direction from the current color 205a and no more than two color variants may be displayed in the negative direction from the current color for each axis. For example, with respect to the Cyan axis, color variant 205b and color variant 205c may represent colors having increasingly more Cyan than the current color 205a, and color variant 205d and color variant 205e may represent colors having increasingly less Cyan than the current color. As such, the ring-around color display 205, as depicted in FIG. 2A, may include rings of color variants corresponding to a number of increments away from the center color in a particular color and direction. Additional and/or fewer color variants may be provided for each axis within the scope of this disclosure.

Figure 2B:
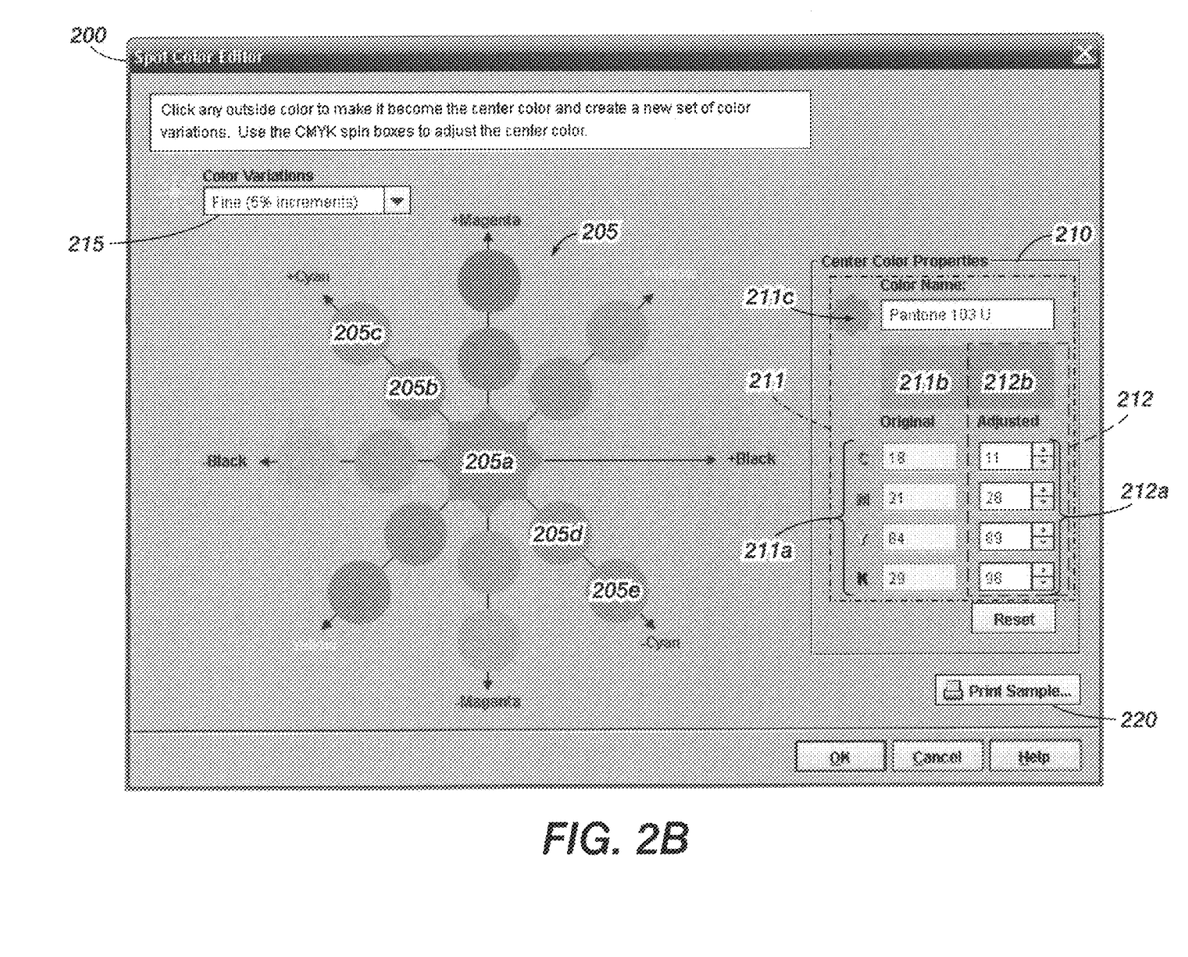
FIG. 2B depicts an alternate exemplary graphical user interface screen displaying an editing tool for spot colors according to an embodiment.

If a current color 205a is near the end of a range for at least one of the color components, one or more color variant positions in the ring-around color display 205 may not be populated. For example, as shown in FIG. 2B, if the current color has a Black value that is at or sufficiently near 100%, less than all potential color variant positions may be populated on the positive Black axis. Similarly, if the current color has a color value that is at or sufficiently near 0% for a particular color component, less than all potential color variant positions may be populated in the negative axis for that color component.

Each color variant may be selectable, for example, by clicking on the color variant. When selected, a color variant may be placed in the central location 205a and be identified as the new current color. New color variants may also be generated in the ring-around color display 205 based on the new current color. A corresponding update to the center color properties display 210 is described below.

The center color properties display 210 may display information pertaining to the original spot color 211 and an adjusted spot color 212. The current spot color information 211 may include a color formula 211a, a color swatch 211b and a color name 211c. The color formula 211a for the current spot color may include values for each color component. Adjusted spot color information 212 may be shown, for example, when a user places a pointer over a color variant in the ring-around color display 205. When shown, the adjusted spot color information 212 may include a color formula 212a and a color swatch 212b. In an embodiment, the user may adjust the color formula 212a for the adjusted spot color. The color swatch 212b for the adjusted spot color may be updated dynamically as the color formula 212a is adjusted.

The color variation selection tool 215 may enable a user to control the increment size of the color variation steps in the ring-around color display 205. For example, the color variation selection tool 215 may enable the user to select from increment sizes of 1 ("Super Fine"), 3 ("Fine"), 5 ("Medium") and 10 ("Coarse"). The selected color variation increment size may determine a color formula difference between adjoining color swatches in the ring-around color display 205. For example, adjacent color swatches along the C axis may differ by 1 with respect to the amount of Cyan if an increment size of 1 is selected in the color variation selection tool 215. Alternate, additional and/or fewer increment sizes may be provided within the scope of this disclosure.

Selecting the print sample button 220 may cause a print sample to be printed on an associated printing device. An exemplary print sample is discussed below in reference to FIG. 5.

FIG. 3 depicts an alternate exemplary graphical user interface screen 300 displaying an editing tool for spot colors according to an embodiment. The graphical user interface screen 300 of FIG. 3 is substantially the same as the graphical user interface screen of FIG. 2A with the exception of the number of axes displayed. In addition to the Cyan, Magenta, Yellow and Black axes displayed in FIG. 2A, FIG. 3 further includes Orange and Violet axes. Alternate, additional or fewer axes may be used with a graphical user interface screen within the scope of this disclosure.

Figure 4:
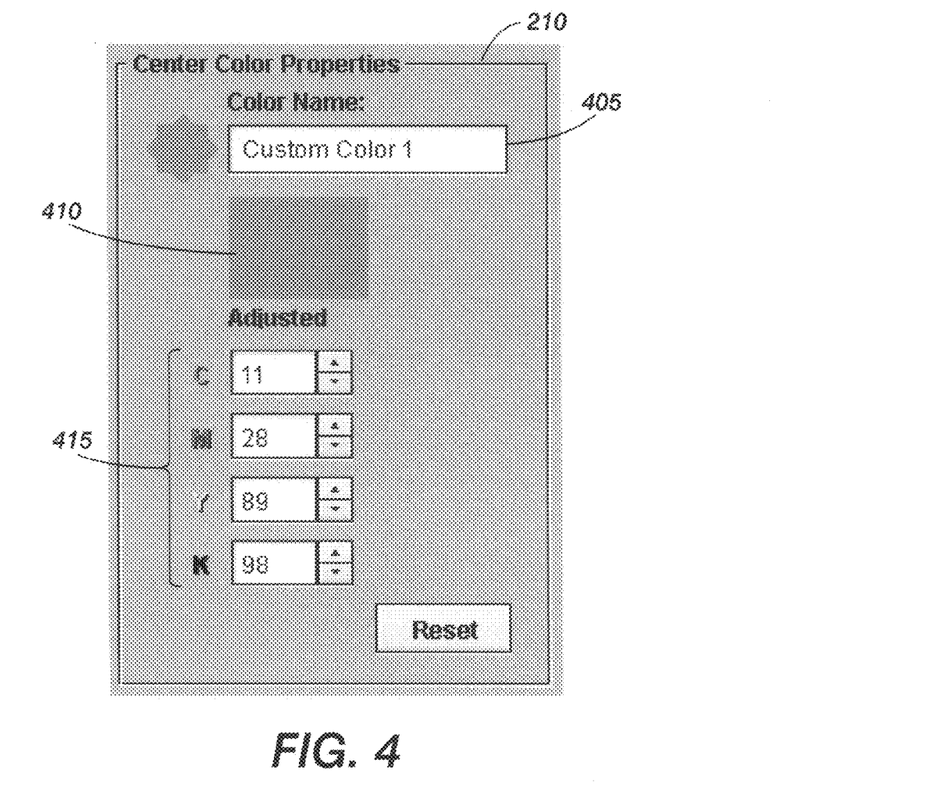
FIG. 4 depicts exemplary graphical user interface screens displaying information pertaining to particular spot colors according to embodiments.

FIG. 4 depicts an exemplary graphical user interface screen displaying information pertaining to a spot color according to an embodiment. As shown in FIG. 4, if an existing spot color is not selected prior to accessing the spot color editor graphical user interface screen 200, the center color properties display 210 may display information only for an adjusted spot color. For example, the center color properties display 210 may include a color name 405, a color swatch 410 and a color formula 415. The color name 405 and color formula 415 may be edited by the user. The color swatch 410 may be adjusted based on values entered for the color formula 415. As the information in the center color properties display 210 is updated, the ring-around color display 205 may update as well.

Figure 5:
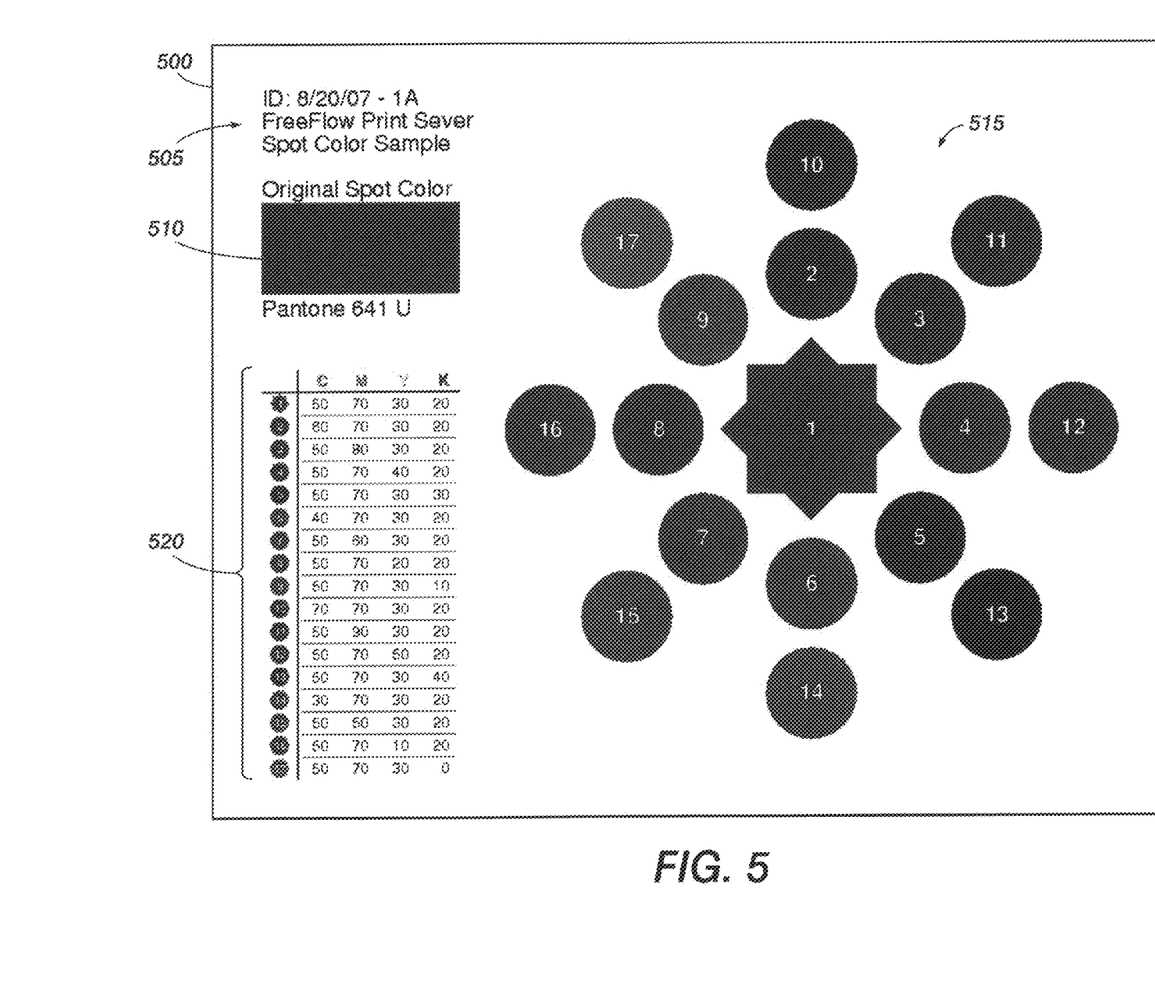
FIG. 5 depicts an exemplary print sample according to an embodiment.

FIG. 5 depicts an exemplary print sample according to an embodiment. As shown in FIG. 5, the print sample 500 may include header information 505, the original spot color 510 (if any), a ring-around color display 515 and a color formula table 520. The header information 505 may include the date and/or time at which the print sample 500 was printed, a user-entered designation, a version number and/or the like. As such, the header information 505 may enable a user to verify which print sample is being examined.

The original spot color 510 may include a color swatch and a color name (if any). The original spot color 510 may correspond to, for example, a spot color that was initially selected from the spot color list graphical user interface screen 100 or a spot color selected during a previous iteration.

The ring-around color display 515 may include, for example, a center color corresponding to a currently selected color and one or more rings having color swatches corresponding to colors that are increments away from the currently selected color in a corresponding color component. In an embodiment, each color swatch may be numbered, lettered, and/or otherwise designated. The color formula table 520 may correspond to the ring-around color display 515. For example, each color swatch in the ring-around color display 515 may have a corresponding entry in the color formula table 520 listing the color formula for the color swatch.

Figure 6:
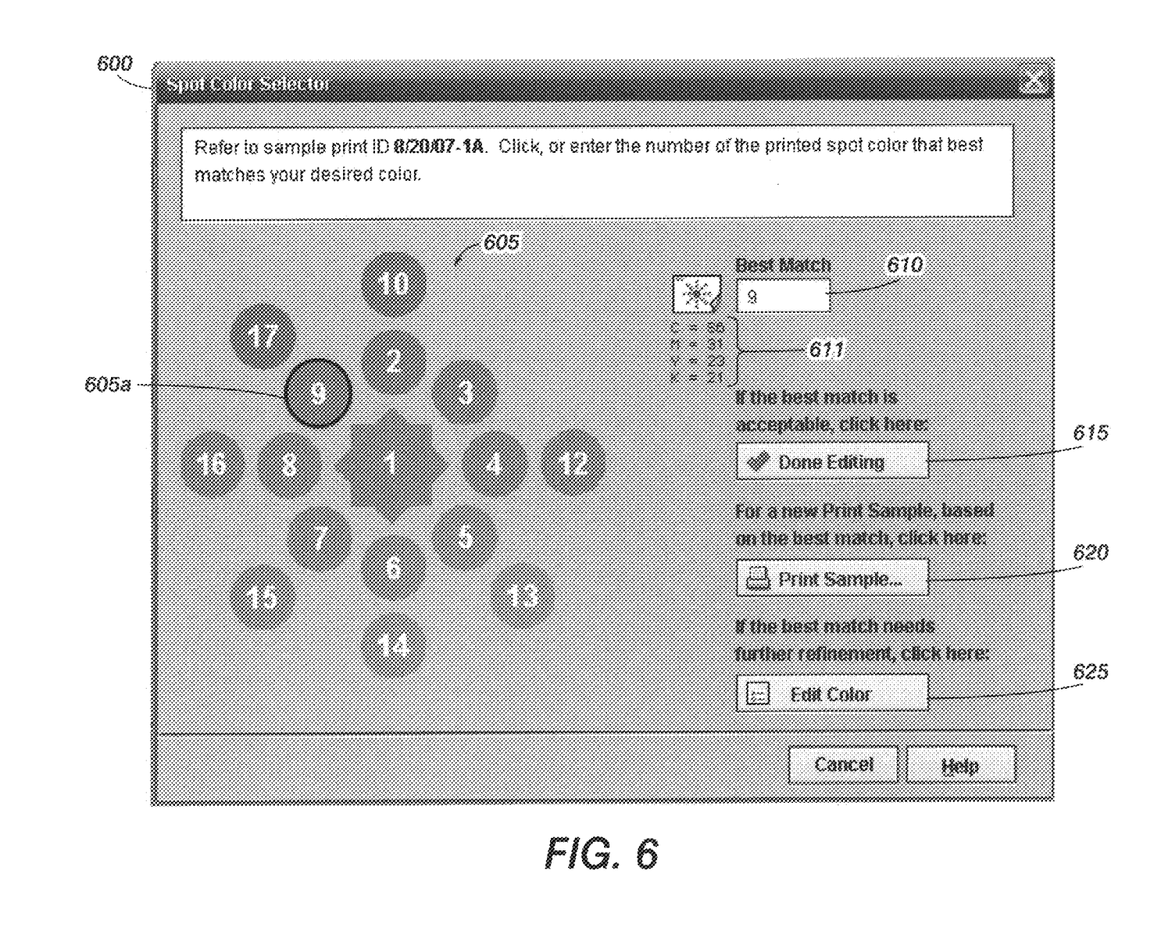
FIG. 6 depicts an exemplary graphical user interface screen enabling selection of one of a plurality of spot colors according to an embodiment.

FIG. 6 depicts an exemplary graphical user interface screen enabling selection of one of a plurality of spot colors according to an embodiment. As shown in FIG. 6, the spot color selector graphical user interface screen 600 may include, for example and without limitation, a ring-around color display 605, a best match entry field 610, a done editing button 615, a print sample button 620 and a edit color button 625.

The ring-around color display 605 of the spot color selector graphical user interface screen 600 may be substantially similar to the ring-around color display 515 of the print sample 500 in that each color swatch may include a corresponding designation. Moreover, the designations used in the ring-around color display 605 of the spot color selector graphical user interface screen 600 and the ring-around color display 515 of the print sample 500 may be identical based on position. A user may select a color swatch, such as 605a, that best matches a desired color found on a print sample 500. Alternately, a user may enter the designator corresponding to a selected color swatch in the best match entry field 610. In an embodiment, if the user selects a color swatch, the best match entry field 610 is populated with the designator for the selected color swatch. Alternately, if the user enters a designator in the best match entry field 610, the corresponding color swatch may be highlighted in the ring-around color display 605. In an embodiment, if either a color swatch is selected or a designator is entered into the best match entry field 610, the color formula 611 for the designated color may be displayed.

If a designated color is acceptable for printing, the done editing button 615 may be selected. The user may note the color formula 611 to be used to produce the particular color.

If a new print sample 500 is required, the print sample button 620 may be selected. Selecting the print sample button 620 may cause a designated color to become the center color for the print sample 500.

If further editing is required, the edit color button 625 may be selected. Selecting the edit color button 625 may cause the spot color editor graphical user interface screen 200 to be displayed. For example, if the increment between color swatches is too fine or too coarse, the edit color button 625 may be selected so that the user can alter the value assigned to the color variation selection tool 215. Alternate and/or additional reasons for returning to the spot color editor graphical user interface screen 200 are included within the scope of this disclosure.

Figure 7:
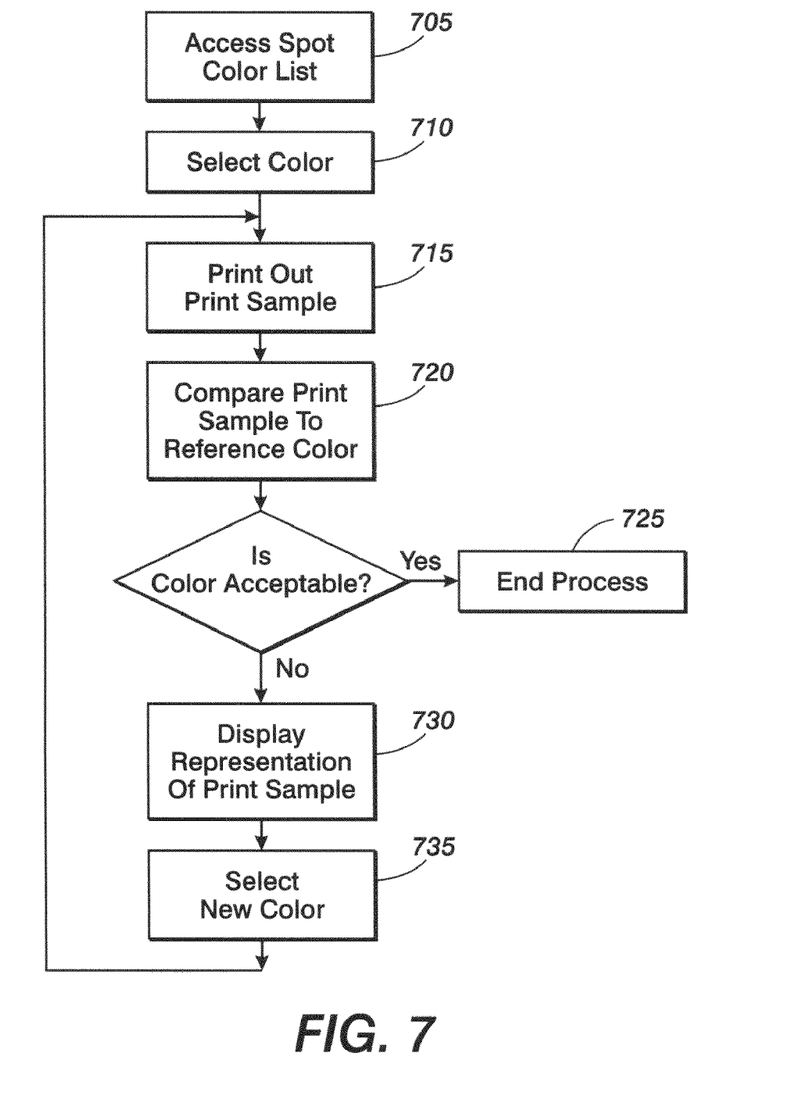
FIG. 7 depicts a flow diagram for an exemplary method of selecting a spot color from a print sample according to an embodiment.

FIG. 7 depicts a flow diagram for an exemplary method of managing existing spot colors according to an embodiment. As shown in FIG. 7, a user may determine whether a printing device is outputting color that satisfies the user's or a customer's quality standards by, for example, accessing 705 a spot color list (such as is shown in FIG. 1), selecting 710 a color, printing 715 a print sample (such as is shown in FIG. 5), and comparing 720 the print sample to a reference. In an embodiment, the user may visually compare 720 the print sample to a reference, such as a Pantone® chip or an existing print. In an embodiment, the user may compare 720 the print sample with a spectrophotometer. If a color depicted on the print sample is acceptable, the spot color printing process may be terminated by a user 725. Otherwise, the user may adjust 735 the color.

Adjusting 735 the color may require the user to utilize a graphical user interface and the printing device. The graphical user interface may display 730 a representation of the print sample to provide a visual means for adjusting 735 the color. However, the colors represented by the graphical user interface are merely approximations of the actual colors produced by the printing device. Accordingly, a new print sample may be printed 715 after the color is adjusted 735. The new print sample may then be compared 720 to the reference to determine the actual color quality. The process may iterate through the printing 715, comparing 720, displaying 730 and adjusting 735 operations until the user accepts the color of the print sample and terminates the process 725.

In an embodiment, adjusting 735 the color may include adjusting the color formula for the color using, for example, a graphical user interface, such as is shown in FIG. 2A. The color may be adjusted using the ring-around color display and/or the values in the center color properties display. In an alternate embodiment, adjusting 735 the color may include selecting a non-center color in a representation of the print sample, such as is shown in FIG. 6.

Figure 8:
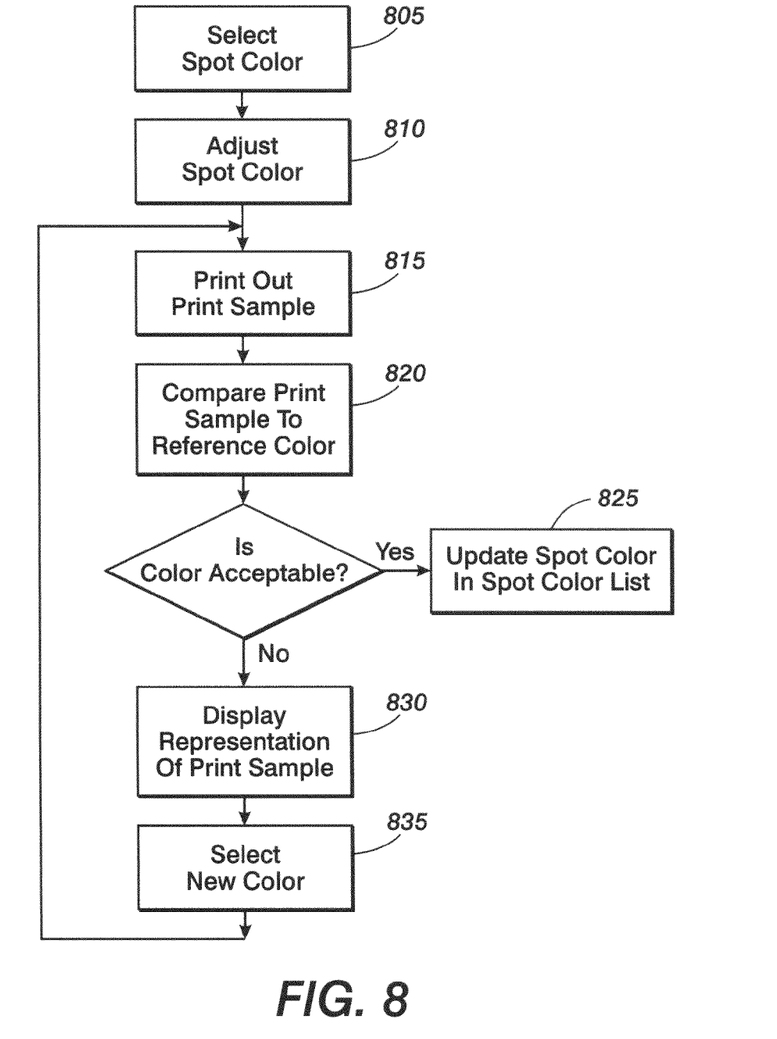
FIG. 8 depicts a flow diagram for an exemplary method of editing an existing spot color according to an embodiment.

FIG. 8 depicts a flow diagram for an exemplary method of editing an existing spot color according to an embodiment. This method may be performed if a user desires to modify a spot color that is known to be in error, such as from analyzing a proof document. As shown in FIG. 8, a user may select 805 a spot color, such as from a spot color list, and adjust 810 the spot color using, for example, the spot color editor graphical user interface screen shown in FIG. 2A. When desired, a print sample may be printed 815. In an embodiment, the print sample may include a ring-around color display. The colors on the print sample may be compared 820 with a reference. If the spot color substantially matches the reference, the spot color may be updated 825 in the spot color list, and the process may terminate. If the spot color does not substantially match the reference, a representation of the print sample may be displayed 830 to assist the user is selecting 835 a new color. In an embodiment, the new color may be selected 835 by selecting a non-center color in the representation of the print sample. In an alternate embodiment, the color may be adjusted using, for example, the spot color editor graphical user interface screen. In either case, a new color sample may be printed 815 once the new color has been selected 835.

Figure 9:
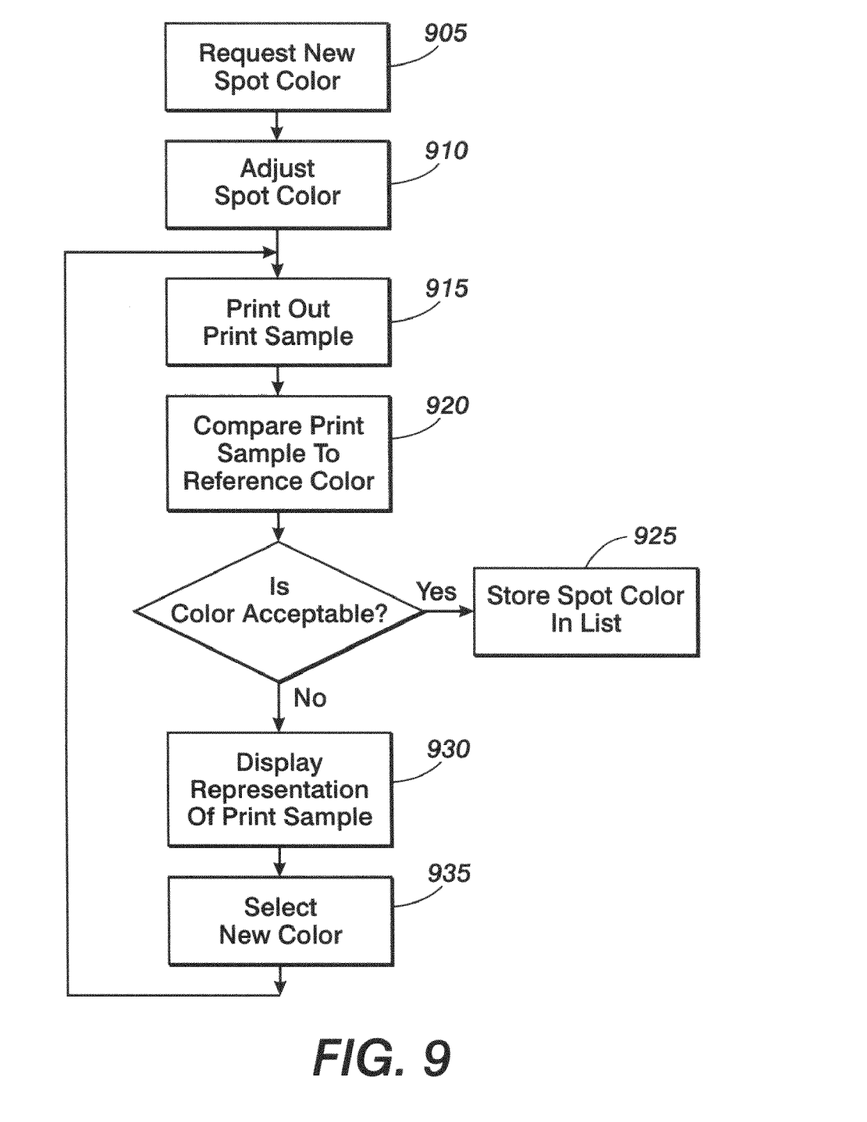
FIG. 9 depicts a flow diagram for an exemplary method of selecting a spot color according to an embodiment.

FIG. 9 depicts a flow diagram for an exemplary method of adding a spot color according to an embodiment. This method may be performed if a user desires to add a new spot color to a list of spot colors. As shown in FIG. 9, a user may select 905 an option enabling the selection of an initial spot color as a starting point for determining a new spot color. The new spot color may be adjusted 910 using, for example, the spot color editor graphical user interface screen shown in FIG. 2A. When desired, a print sample may be printed 915. In an embodiment, the print sample may include a ring-around color display. The colors on the print sample may be compared 920 with a reference. If the new spot color substantially matches the reference, the new spot color may be stored 925 in a spot color list. If the new spot color does not substantially match the reference, a representation of the print sample may be displayed 930 on a display device, and an alternate color may be selected 935. In an embodiment, the alternate color may be selected 935 from the representation of the print sample. In an alternate embodiment, the new alternate color may be adjusted using, for example, the spot color editor graphical user interface screen. In either case, a new color sample may be printed 915 once the alternate color for the new spot color has been selected.

Figure 10A:
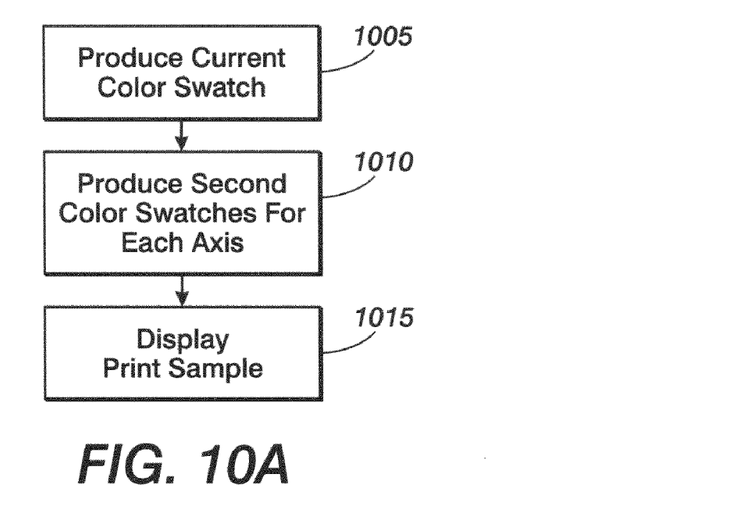
FIGS. 10A-B depict flow diagrams for exemplary methods of producing print samples according to an embodiment.

FIG. 10A depicts a flow diagram for an exemplary method of producing a print sample according to an embodiment. As shown in FIG. 10A, a first color swatch may be produced 1005 at a center position of the print sample. The first color swatch may correspond to a current color.

The first color swatch may be substantially star-shaped, such as is shown in print samples 515 and 605. In an embodiment, the star-shaped first color swatch may have a plurality of points. In an embodiment, each point may be aligned with an axis corresponding to a particular color component. In an embodiment, each axis may be aligned with two corresponding points: a first corresponding point aligned in a positive direction for the axis and a second corresponding point aligned in a negative direction for the axis.

Each axis may correspond to a color component. For example, if a CMYK set of printing materials is used, four axes are used where one axis corresponds to each color component: cyan, magenta, yellow and black. If a high fidelity set of printing materials is used, an axis corresponding to each color component may be used (i.e., more than 4 axes may be used).

For each axis, a plurality of second color swatches may be produced 1010 along the axis. Each second color swatch on an axis may differ from the first color swatch by an amount of the color component corresponding to the axis. Second color swatches aligned on a positive direction of the axis may have increasingly more of the color component than the first color swatch. For example, a second color swatch aligned on a positive direction of the axis that is closest to the first color swatch may differ from the first color swatch by a first amount of the color component and a second color swatch aligned on a positive direction of the axis that is next closest to the first color swatch may differ from the first color swatch by a second amount. In an embodiment, the second amount may be twice as much as the first amount. Similarly, a second color swatch aligned on a negative direction of the axis that is closest to the first color swatch may differ from the first color swatch by a first amount of the color component and a second color swatch aligned on a negative direction of the axis that is next closest to the first color swatch may differ from the first color swatch by a second amount. In an embodiment, at least one second color swatch may be substantially circular.

The print sample, including the first color swatch and the second color swatches may be displayed 1015. In an embodiment, displaying 1015 the print sample may include causing the print sample to be shown on a display. Alternately or additionally, displaying 1015 the print sample may include printing the print sample or otherwise producing a physical representation of the print sample.

One advantage of using a star-shaped first color swatch may be improved color recognition. Human color perception is affected by the size of a particular color swatch. For example, a smaller color swatch can be perceived to have a different color than a larger color swatch of the same color. Utilizing a star-shaped color swatch minimizes the difference in the perception of the current color from the colors represented by the second color swatches while providing increased recognition of the center position by a human observer.

Figure 10B:
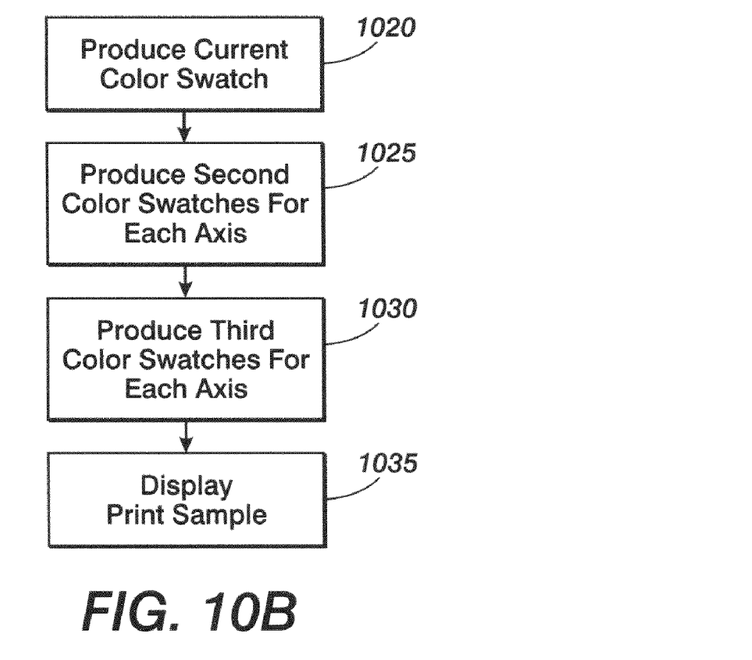

FIG. 10B depicts a flow diagram for an alternate exemplary method of producing a print sample according to an embodiment. As shown in FIG. 10B, a first color swatch may be produced 1020 at a center position of the print sample. The first color swatch may correspond to a current color, which includes a value for each of a plurality of color components.

A plurality of second color swatches may be produced 1025. Each second color swatch may include a color that differs from the first color swatch (i.e., the current color) with respect to only one color component. For each second color swatch, the color component that differs from the first color swatch differs by a first magnitude (i.e., the difference may be equal to +first_magnitude or −first_magnitude). For example, as discussed above in reference to FIG. 2, a color variation selection tool 215 may be used to determine the magnitude of the color variation between color swatches, such as first and second color swatches. In an embodiment, the magnitude selected by a color variation selection tool 215 may equal the first magnitude.

Referring back to FIG. 10B, each second color swatch may be arranged along an axis corresponding to the color component by which the second color swatch differs from the first color swatch. Moreover, each second color swatch may be arranged according to a polarity of the first magnitude by which the second color swatch differs from the first color swatch. For example, a second color swatch that has a greater value for a differing color component than the first color swatch may be placed above the first color swatch, and a second color swatch that has a lesser value for the differing color component than the first color swatch may be placed below the first color swatch. Alternate arrangements are similarly included within the scope of this disclosure.

A plurality of third color swatches may also be produced 1030. Each third color swatch may include a color that differs from the first color swatch with respect to only one color component. For each third color swatch, the color component that differs from the first color swatch may differ by a second magnitude (i.e., the difference may be equal to +second_magnitude or −second_magnitude). Each third color swatch may be arranged along the axis corresponding to the color component by which the third color swatch differs from the first color swatch. Moreover, each third color swatch may be arranged according to a polarity of the second magnitude by which the third color swatch differs from the first color swatch. For example, a third color swatch that has a greater value for a differing color component than the first color swatch may be placed above the first color swatch, and a third color swatch that has a lesser value for the differing color component than the first color swatch may be placed below the first color swatch. Alternate arrangements are similarly included within the scope of this disclosure.

In an embodiment, the second magnitude may be greater than the first magnitude and each third color swatch may be arranged at a distance from the first color swatch that is greater than the distance between the second color swatch and the first color swatch.

In an embodiment, the second magnitude may be equal to two times the first magnitude. In such an embodiment, a distance between a third color swatch on an axis and a nearest second color swatch on the same axis may substantially equal a distance between the second color swatch and the first color swatch.

In an embodiment, the current color may include a value for each of at least four color components. In an embodiment, the current color may include a value for each of at least six color components.

The print sample, including the first color swatch, the second color swatches and the third color swatches may be displayed 1035. In an embodiment, displaying 1035 the print sample may include causing the print sample to be shown on a display. Alternately or additionally, displaying 1035 the print sample may include printing the print sample or otherwise producing a physical representation of the print sample.

Figure 11:
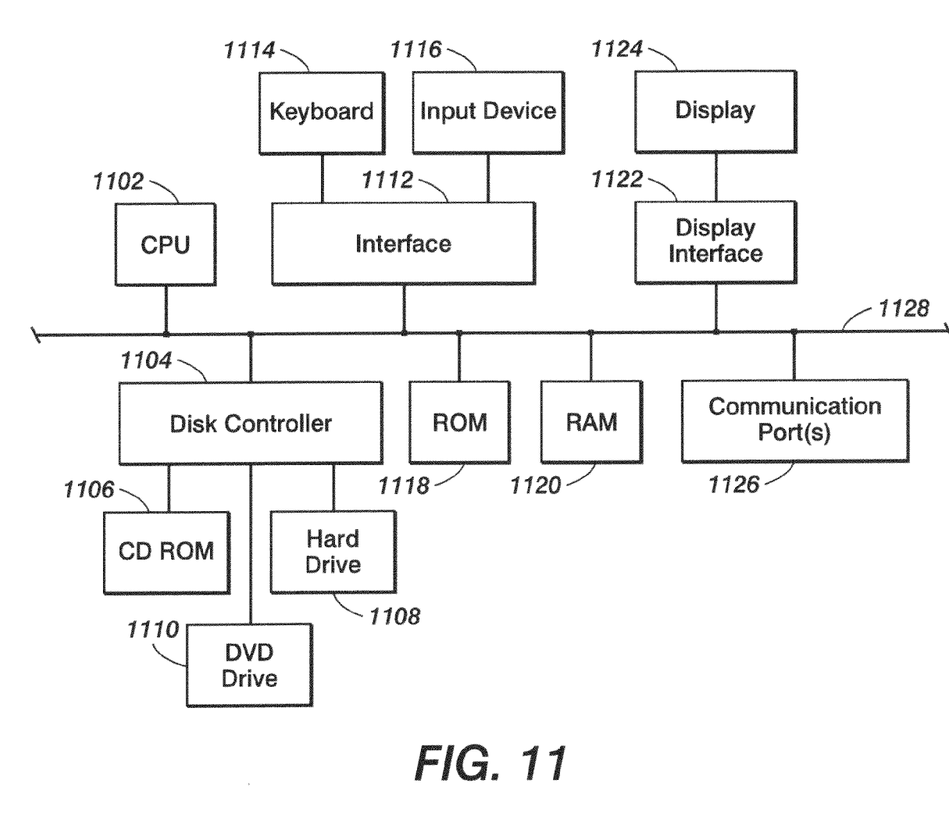
FIG. 11 is a block diagram of exemplary internal hardware that may be used to contain or implement program instructions according to an embodiment.

FIG. 11 is a block diagram of exemplary internal hardware that may be used to contain or implement program instructions according to an embodiment. Referring to FIG. 11, a bus 1128 serves as the main information highway interconnecting the other illustrated components of the hardware. CPU 1102 is the central processing unit of the system, performing calculations and logic operations required to execute a program. Read only memory (ROM) 1118 and random access memory (RAM) 1120 constitute exemplary memory devices.

A disk controller 1104 interfaces with one or more optional disk drives to the system bus 1128. These disk drives may include, for example, external or internal DVD drives 1110, CD ROM drives 1106 or hard drives 1108. As indicated previously, these various disk drives and disk controllers are optional devices.

Program instructions may be stored in the ROM 1118 and/or the RAM 1120. Optionally, program instructions may be stored on a tangible computer readable medium such as a compact disk, a digital disk or other recording medium.

A display interface 1122 may permit information from the bus 1128 to be displayed on the display 1124 in audio, graphic or alphanumeric format. Communication with external devices may occur using various communication ports 1126. An exemplary communication port 1126 may be attached to a communications network, such as the Internet or an intranet. In an embodiment, an exemplary communication port 1126 may enable communication with a printing device.

In addition to the standard computer-type components, the hardware may also include an interface 1112 which allows for receipt of data from input devices such as a keyboard 1114 or other input device 1116, such as a mouse, remote control, pointer and/or joystick.

An embedded system, such as a sub-system within a xerographic apparatus, may optionally be used to perform one, some or all of the operations described herein. Likewise, a multiprocessor system may optionally be used to perform one, some or all of the operations described herein.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the disclosed embodiments.

What is claimed is:

1. A method of selecting a color for a print operation, the method comprising:
   selecting a color based on a reference color, wherein the selected color comprises a color formula having a plurality of color components;

printing, on a printing device, a print sample based on the selected color, wherein the print sample comprises the selected color and a plurality of rings of color variants, wherein each ring comprises a plurality of color variants differing from a color component of the selected color by a corresponding amount, wherein each color variant is aligned axially based on the color component that differs from the selected color and a magnitude of a difference between the color component of the color variant and the color component of the selected color, wherein a magnitude of a difference between the color component of the selected color and a first color variant in a first ring is equal to a magnitude of a difference between the color component of the first color variant and a second color variant in a second ring;

comparing the print sample to the reference color; and printing, on the printing device, a document using at least the color formula for the selected color.

2. The method of claim 1, further comprising:

displaying a representation of the print sample on a display device; and selecting a new color based on at least the print sample.

3. The method of claim 2 wherein printing a print sample, comparing the print sample, displaying a representation of the print sample, and selecting a new color are iteratively performed.

4. The method of claim 2 wherein the selected color and the color variants are identically arranged in the print sample and the representation of the print sample.

5. The method of claim 1 wherein the plurality of color components comprise a cyan component, a magenta component, a yellow component and a black component.

6. The method of claim 1 wherein a magnitude of a difference of a color component between the selected color and a color variant is selected by a user.

7. The method of claim 1 wherein selecting a color based on a reference color comprises selecting a color from a list of spot colors.

8. The method of claim 1, further comprising:

storing the selected color in a list of spot colors.

9. A system for selecting a color for a print operation, the system comprising:

a processor;

a processor-readable non-transitory storage medium in communication with the processor;

a display device in communication with the processor; and a printing device in communication with the processor, wherein the processor-readable non-transitory storage medium contains one or more programming instructions for:

receiving a selection of a color, wherein the selected color comprises a color formula having a plurality of color components, printing, on a printing device, a print sample based on the selected color, wherein the print sample comprises the selected color and a plurality of rings of color variants, wherein each ring comprises a plurality of color variants differing from a color component of the selected color by a corresponding amount, wherein each color variant is aligned axially based on the color component that differs from the selected color and a magnitude of a difference between the color component of the color variant and the color component of the selected color, wherein a magnitude of a difference between the color component of the selected color and a first color variant in a first ring is equal to a magnitude of a difference between the color component of the first color variant and a second color variant in a second ring, displaying a representation of the print sample on the display device, and printing, via the printing device, a document using at least the color formula for the selected color.

10. The system of claim 9 wherein the processor-readable storage medium further contains one or more programming instructions for receiving a selection of a new color in response to displaying the representation of the print sample.

11. The system of claim 10 wherein the one or more instructions for printing a print sample, displaying a representation of the print sample, and receiving a selection of a new color are iteratively performed.

12. The system of claim 9 wherein the one or more instructions for receiving a selection of a color comprises one or more instructions for:

displaying a list of spot colors on the display device; and receiving a selection of a color from the list of spot colors.

13. The system of claim 9 wherein the processor-readable storage medium further contains one or more programming instructions for storing the selected color in a list of spot colors.

14. A method of producing a print sample, the method comprising:

producing a first color swatch, wherein the first color swatch comprises a current color, wherein the current color comprises a value for each of a plurality of color components;

producing a plurality of second color swatches, wherein each second color swatch comprises a color that differs from the first color swatch with respect to only one color component, wherein, for each second color swatch, the color component that differs from the first color swatch differs by a first magnitude;

producing a plurality of third color swatches, wherein each third color swatch comprises a color that differs from the first color swatch with respect to only one color component, wherein, for each third color swatch, the color component that differs from the first color swatch differs by a second magnitude; and displaying the print sample comprising the first color swatch, the plurality of second color swatches and the plurality of third color swatches, wherein the first color swatch is located at a center position of the print sample, wherein each second color swatch is arranged along an axis corresponding to the color component by which the second color swatch differs from the first color swatch and according to a polarity of the first magnitude, wherein each third color swatch is arranged along the axis corresponding to the color component by which the third color swatch differs from the first color swatch and according to a polarity of the second magnitude at a distance from the first color swatch that is greater than a distance between the second color swatch and the first color swatch, wherein the second magnitude is greater than the first magnitude.

15. The method of claim 14 wherein the second magnitude is equal to two times the first magnitude.

16. The method of claim 15 wherein, for each axis, a distance between a third color swatch on the axis and a nearest second color swatch on the axis substantially equals a distance between the second color swatch and the first color swatch.

17. The method of claim 14 wherein the current color comprises a value for each of at least four color components.

* * * * *